United States Patent [19]
Uchiyama et al.

[11] Patent Number: 5,512,665
[45] Date of Patent: Apr. 30, 1996

[54] SULFONATED COMPOUNDS OF β-CYCLODEXTRIN POLYMER AND INHIBITORY DRUG FOR VASCULAR WALL HYPERPLASIA CONTAINING THE SAME

[75] Inventors: Hideki Uchiyama, Yokohama; Hiroaki Kasukawa, Isehara; Eiko Takeda, Hadano; Junichirou Watanabe, Hiratsuka; Ryoichi Nanba, Nakai, all of Japan

[73] Assignee: Terumo Kabushiki Kaisha, Tokyo, Japan

[21] Appl. No.: 117,755

[22] Filed: Sep. 8, 1993

[30] Foreign Application Priority Data

Sep. 24, 1992 [JP] Japan ................................. 4-254552

[51] Int. Cl.$^6$ ................................................. A61K 31/00
[52] U.S. Cl. ................ 536/4.1; 536/46; 536/58; 536/102; 536/103
[58] Field of Search ....................... 536/4, 1, 102, 536/103, 46, 58; 514/58, 777, 778

[56] References Cited

U.S. PATENT DOCUMENTS

| | | |
|---|---|---|
| 2,923,704 | 2/1960 | Berger et al. . |
| 4,444,647 | 4/1984 | Horikoshi et al. ............... 208/11 LE |
| 4,968,584 | 11/1990 | Nagashima et al. ................ 430/309 |
| 5,183,809 | 2/1993 | Weisz et al. ........................... 514/58 |
| 5,262,404 | 11/1993 | Weisz et al. ........................... 514/58 |

FOREIGN PATENT DOCUMENTS

WO 93/09790   5/1993   WIPO .

*Primary Examiner*—Nathan M. Nutter
*Attorney, Agent, or Firm*—Burns, Doane, Swecker & Mathis

[57] ABSTRACT

This invention relates to sulfonates of β-cyclodextrin polymer having a sulfur content of 10% or more, which inhibit propagation of smooth muscle cells.

6 Claims, No Drawings

SULFONATED COMPOUNDS OF β-CYCLODEXTRIN POLYMER AND INHIBITORY DRUG FOR VASCULAR WALL HYPERPLASIA CONTAINING THE SAME

BACKGROUND OF THE INVENTION

1. Field of the Invention

The present invention relates to sulfonates of β-cyclodextrin polymer and their uses.

2. Description of the Prior Art

It is known that a significant cause of presentation of the symptoms of angina pectoris, myocardial infarction and the like diseases is coronary arteriosclerosis, which precedes such diseases. Lumen stenosis and loss of elasticity of blood vessels caused by arteriosclerosis result in insufficiency of nutrients and oxygen in myocardial tissues, leading to the symptoms of the above-mentioned diseases. It is said that vascular lumen stenosis is essentially caused by accumulation of foamy macrophage and cholesterol on the inner walls of blood vessels and additionally by cellular fibrous intimal thickening caused by migration of vascular medial smooth muscle cells to intima; also by propagation of the cells in intima. For medical treatment of angina pectoris and myocardial infarction, antithrombotic drugs, vasodilator drugs and the like are used essentially for the purpose of relieving the symptoms of the diseases, which drugs, however, could not cure the vascular lumen stenosis and loss of elasticity of blood vessels caused by arteriosclerosis. Apart from those, no medicines capable of curing the symptoms of the above-mentioned diseases have heretofore been known. In this situation, medicines capable of inhibiting or curing vascular wall hyperplasia, which causes vascular stenosis, are badly needed. Recently, as a means of surgically curing vascular stenosis, percutaneous transliminal coronary angioplasty (PTCA) has become popular. In PTCA, a balloon catheter is inserted into the vascular tract through the crural artery by remote control and the balloon is expanded in the narrowed area of the vein so that the blood vessel is physically expanded. However, the most troublesome problem is that from 30 to 50% of the patients so treated have vascular stenosis again in 3 to 6 months after the operation. The recurrence of the stenosis is not accompanied by deposition of cholesterol on the blood vessel but is a cellular fibrous intimal thickening almost completely of smooth muscle cells and intercellular matrix produced by the cells. Therefore, for inhibition of the recurrence of stenosis after PTCA and also for non-surgical treatment of arteriosclerosis, it is effective to inhibit migration and propagation of the smooth muscle cells produced in the vascular lumen. In the prior art, β-cyclodextrin sulfate (U.S. Pat. No. 5,019,562), heparin fragments (U.S. Pat. No. 5,032,679) and catechol derivatives (Japanese Patent Application Laid-Open No. 4-154720) have been reported as useful for such treatment, but an active substance capable of more strongly inhibiting propagation of smooth muscle cells is still very much to be desired.

SUMMARY OF THE INVENTION

We, the present inventors, synthesized various β-cyclodextrin derivatives and earnestly investigated their pharmaceutical activities and, as a result, have found that, of sulfonate compounds of β-cyclodextrin polymer as produced by crosslinking and polymerizing β-cyclodextrin, those having a sulfur content of 10% or more specifically inhibit the propagating action of cultivated smooth muscle cells to be augmented by a platelet derived growth factor or serum. From the finding, we further have found that such sulfonate compounds of β-cyclodextrin polymer are effective for inhibition of cellular fibrous intimal thickening, and thus achieved the present invention.

An object of the present invention is to provide an inhibitory drug for vascular wall hyperplasia capable of inhibiting propagation of smooth muscle cells. A further object of the present invention is to provide an inhibitory drug against restenosis after PTCA. Another object of the present invention is to provide a drug for curing arteriosclerosis.

The compounds having the above-mentioned activities are sulfonates of β-cyclodextrin polymer and having a sulfur content of 10% or more, and their pharmaceutically acceptable salts.

DETAILED DESCRIPTION OF THE INVENTION

The present invention relates to novel sulfonates of β-cyclodextrin polymer and their salts having the action of inhibiting vascular wall hyperplasia. The β-cyclodextrin polymer of the present invention is preferably one produced by polymerization of from 2 to 40, especially from 2 to 10 β-cyclodextrins. β-cyclodextrin polymer is a compound produced by heating a commercial β-cyclodextrin in an alkaline solution having an alkali concentration of about 40% in the presence of a crosslinking agent such as epichlorohydrin or the like at 50° C. or so, and the degree of the polymerization may be controlled by selecting the concentration of the crosslinking agent to be used, for example in the range of from 5 to 50%. Especially preferably, the concentration is selected from the range of approximately from 10 to 30%.

If desired, β-cyclodextrin may be reacted with a condensing agent such as dicyclohexylcarbodiimide or hydroxybenzotriazole to form a dimer.

By further reacting the polymer with a sulfonating agent, sulfonates of β-cyclodextrin polymer of the present invention are obtained. The sulfur content in the sulfonates may be controlled in dependence upon the amount of the sulfonating agent used, the reaction temperature and the reaction time. In order to attain the effect of the present invention, the sulfonates needed to have a sulfur content of 10% or more, preferably 12% or more. The sulfur content as referred to herein means percentage by weight of the sulfur in the sulfonates of β-cyclodextrin polymer.

Therefore, where all the available hydroxyl groups in the β-cyclodextrin polymer have been substituted by sulfonate groups (—$O.SO_3$), the sulfur content of the polymer sulfonate is about 20%.

The sulfur content was measured by ICP-AES (induced coupled plasma-atomic emission spectroscopy).

As preferred sulfonating agents to be used in the present invention, mentioned are, for example, sulfur trioxide complexes (such as sulfur trioxide/pyridine complex, sulfur trioxide/trialkylamine complex, sulfur trioxide/dimethylformamide complex, sulfur trioxide/dioxane complex, etc.), sulfuric acid anhydride, concentrated sulfuric acid, chlorosulfuric acid and the like. The amount of the sulfonating agent to be used is preferably an excess amount to the hydroxyl equivalent of the β-cyclodextrin polymer to be sulfonated therewith, and it is especially preferably from 2 to 6 equivalents to the latter. The reaction solvent to be used in the reaction preferably includes, for example, tertiary amines (e.g., pyridine, picoline, lutidine, N,N-dimethylaniline), N,Ndimethylformamide, formamide, dimethylsulfoxide and the like. The reaction may be carried out at a temperature of falling within the range of from −20° C. to 80° C., especially preferably within the range of from 50° C. to 80° C. The reaction time is generally approximately from 1 hour to 20 hours, which may suitably be selected in accordance with the reaction temperature and the amount of the sulfonating agent to be used. By the reaction mentioned above, the compounds of the present invention having the necessary sulfur content may be obtained. After the reaction, the product may be isolated and purified by ordinary methods. For instance, the mixture after the reaction may be isolated as precipitates by alcoholic precipitation, for example, with ethanol or the like with removing the reaction solvent therefrom; the precipitates are again dissolved in a pure water or in an aqueous 6% sodium acetate solution for additional alcoholic precipitation; and the precipitates are subjected to column chromatography with a strongly acidic cation-exchange resin column (Dowex 50 W, H+ Type, produced by Dow Chemical Co.) while neutralizing the resulting eluate with an alkaline earth metal to isolate the product as its salt of an alkaline earth metal. The sulfonate compounds of the present invention are suitably used as their free form or their pharmaceutically acceptable salts. The salts are, for example, alkali metal salts such as sodium salt, potassium salt and lithium salt; alkaline earth metal salts such as calcium salt and barium salt; and organic amine salts such as trimethylamine salt and tetrabutylammonium salt. The sulfonate compounds of β-cyclodextrin polymer and their salts of the present invention may be administered either perorally or parenterally (for example, intravenously, intramuscularly, subcutaneously) as an inhibitory drug for vascular wall hyperplasia; and they may be used as suitable medicinal preparations such as tablets, granules, capsules, powder or injection by ordinary methods. The amount of the active ingredient compound of the present invention to be administered to patients varies, depending upon their age and body weight and also upon the condition of their disease. In general, it is suitably approximately from 0.1 to 1000 mg/kg/day, preferably approximately from 1.0 to 500 mg/kg/day, which may administered all at a time or may be divided into two or three parts for plural administrations per day.

EXAMPLES

Example 1

2 g of β-cyclodextrin was dissolved in 1.5 ml of pure water, 2.5 ml of 40% sodium hydroxide and 20 mg of sodium borohydride were added thereto, and 1 ml of epichlorohydrin was added thereto over a period of about 10 minutes with stirring at 50° C. After 2 hours, 2 ml of pure water was added to the reaction system, which was neutralized with 6M hydrochloric acid and then subjected to precipitation with ethanol in an amount five times as large as the amount of the reaction mixture. The resulting precipitates were washed with ethanol and ether and dried to obtain 1.8 g of a white powder. 0.5 g of the thus obtained β-cyclodextrin polymer was dissolved in 10 ml of dry dimethylformamide (DMF), and a solution of 4.3 g of sulfur trioxide/trimethylamine-complex as dissolved in 10 ml of DMF was added thereto. The reaction mixture was heated up to 70° C. with stirring. After reacted for 18 hours, DMF was removed by decantation whereby only a viscous precipitate was left. The thus precipitated residue was dissolved in 10 ml of 6% sodium acetate, and subsequently 30 ml of ethanol was added thereto to give white precipitates. The precipitates were again dissolved in 10 ml of pure water, barium hydroxide was added thereto to make pH 6, then barium carbonate was added thereto to make pH 7, and the solution was subjected to centrifugation to isolate the supernatant. The supernatant was passed through a strongly acidic cationexchange resin (Dowex 50 W, H+ Type, produced by Dow Chemical Co.) with eluting it with pure water to collect the eluate. The eluate was neutralized with 1M sodium hydroxide and freeze-dried to obtain 1.1 g of a white powder. The sodium salt of β-cyclodextrin polymer sulfonate thus obtained was analyzed to give the following data.

(1) Sulfur Content: 13.8% (by SPS 1200VR, manufactured by Seiko Electronic Industry Co.)

(2) Liquid Chromatography
 Column: TSK2000PW (two columns connected)
 Eluent: 0.2M $KH_2PO_4$
 Flow Rate: 1.0 ml/min
 Detector: differential refractometric detector
 Retention Time: about 15.5 min.

(3) Infrared Absorption Spectrum (KBr) 3500, 1650, 1240, 1140, 1050, 1008 $cm^{-1}$ (4) $^{13}$C-NMR (400 Mz) 102.9, 84.5, 81.6, 80.3, 74.0, 71.2 ppm (5) Mean Molecular Weight: about 10,000

Example 2

2 g of β-cyclodextrin was dissolved in 1.5 ml of pure water, 2.5 ml of 40% sodium hydroxide and 20 mg of sodium borohydride were added thereto, and 3 ml of epichlorohydrin was added thereto over a period of about 10 minutes with stirring at 50° C. After 2 hours, 2 ml of pure water was added to the reaction system, which was neutralized with 6M hydrochloric acid and then subjected to precipitation with ethanol in an amount five times as large as the amount of the reaction mixture. The resulting precipitates were washed with ethanol and ether and dried to obtain 1.8 g of a white powder. 0.5 g of the thus obtained β-cyclodextrin polymer was dissolved in 10 ml of dry dimethylformamide (DMF), and a solution of 4.3 g of sulfur trioxide/trimethylamine complex as dissolved in 10 ml of DMF was added thereto. The reaction mixture was heated up to 70° C. with stirring. After reacted for 18 hours, the reaction mixture was treated in the same manner as in Example 1 to give 1.2 g of a white powder. The product was analyzed to give the following data.

(1) Sulfur Content: 14.2%

(2) Liquid Chromatography
 Column: TSK2000PW (two columns connected)
 Eluent: 0.2M $KH_2PO_4$
 Flow Rate: 1.0 ml/min
 Detector: differential refractometric detector
 Retention Time: about 10.3 min.

(3) Infrared Absorption Spectrum (KBr) 3500, 1650, 1240, 1140, 1050, 1008 $cm^{-1}$ (4) $^{13}$C-NMR (400 Mz) 102.9, 84.5, 81.6, 80.3, 74.0, 71.2 ppm (5) Mean Molecular Weight: about 30,000

Example 3

1.1 g of a white powder was obtained in the same manner as in Example 1, except that the amount of the trimethylamine/sulfuric acid complex was changed to 3.5 g. The product was analyzed to give the following data.

(1) Sulfur Content: 10.3%
(2) Liquid Chromatography
Column: TSK2000PW (two columns connected)
Eluent: 0.2M $KH_2PO_4$
Flow Rate: 1.0 ml/min
Detector: differential refractometric detector
Retention Time: about 15.8 min.
(3) Infrared Absorption Spectrum (KBr) 3500, 1650, 1240, 1140, 1050, 1008 $cm^{-1}$
(4) $^{13}$C-NMR (400 Mz) 102.9, 84.5, 81.6, 80.3, 74.0, 71.2 ppm
(5) Mean Molecular Weight: about 10,000

COMPARATIVE EXAMPLE 1

2 g of β-cyclodextrin was dissolved in 1.5 ml of pure water, 2.5 ml of 40% sodium hydroxide and 20 mg of sodium borohydride were added thereto, and 1 ml of epichlorohydrin was added thereto over a period of about minutes with stirring at 50° C. After 2 hours, 2 ml of pure water was added to the reaction system, which was neutralized with 6M hydrochloric acid and then subjected to precipitation with ethanol in an amount five times as large as the amount of the reaction mixture. The resulting precipitates were washed with ethanol and ether and dried to obtain 1.7 g of a white powder. 0.5 g of the thus obtained β-cyclodextrin polymer was dissolved in 10 ml of dry dimethylformamide (DMF), and a solution of 1.5 g of sulfur trioxide/trimethylamine complex as dissolved in 10 ml of DMF was added thereto. The reaction mixture was heated up to 70° C. with stirring. After reacted for 18 hours, DMF was removed by decantation whereby only a viscous precipitate was left as it was. The thus precipitated residue was dissolved in 10 ml of 6% sodium acetate, and subsequently 30 ml of ethanol was added thereto to give white precipitates. The precipitates were again dissolved in 10 ml of pure water, barium hydroxide was added thereto to pH 6, then barium carbonate was added thereto to pH 7, and the solution was subjected to centrifugation to isolate the supernatant. The supernatant was passed through a strongly acidic cation-exchange resin (Dowex 50 W, H+ Type, produced by Dow Chemical Co.) with eluting it with pure water to collect the eluate. The eluate was neutralized with 1M sodium hydroxide and freeze-dried to obtain 1.1 g of a white powder. The sodium salt of β-cyclodextrin polymer sulfonate thus obtained was analyzed to give the following data.

(1) Sulfur Content: 6.50%
(2) Liquid Chromatography
Column: TSK2000PW (two columns connected)
Eluent: 0.2M $KH_2PO_4$
Flow Rate: 1.0 ml/min
Detector: differential refractometric detector
Retention Time: about 16.0 min.
(3) Infrared Absorption Spectrum (KBr) 3500, 1650, 1240, 1140, 1050, 1008 $cm^{-1}$
(4) $^{13}$C-NMR (400 Mz) 102.9, 84.5, 81.6, 80.3, 74.0, 71.2 ppm
(5) Mean Molecular Weight: about 10,000

COMPARATIVE EXAMPLE 2

2 g of β-cyclodextrin was dissolved in 1.5 ml of pure water, 2.5 ml of 40% sodium hydroxide and 20 mg of sodium borohydride were added thereto, and 3 ml of epichlorohydrin was added thereto over a period of about minutes with stirring at 50° C. After 2 hours, 2 ml of pure water was added to the reaction system, which was neutralized with 6M hydrochloric acid and then subjected to precipitation with ethanol in an amount five times as large as the amount of the reaction mixture. The resulting precipitates were washed with ethanol and ether and dried to obtain 1.8 g of a white powder. 0.5 g of the thus obtained β-cyclodextrin polymer was dissolved in 10 ml of dry dimethylformamide (DMF), and a solution of 1.5 g of sulfur trioxide/trimethylamine complex as dissolved in 10 ml of DMF was added thereto. The reaction mixture was heated up to 70° C. with stirring. After reacted for 18 hours, the reaction mixture was treated in the same manner as in Example 1 to give 1.2 g of a white powder. The product was analyzed to give the following data.

(1) Sulfur Content: 6.80%
(2) Liquid Chromatography
Column: TSK2000PW (two columns connected)
Eluent: 0.2M $KH_2PO_4$
Flow Rate: 1.0 ml/min
Detector: differential refractometric detector
Retention Time: about 10.5 min.
(3) Infrared Absorption Spectrum (KBr) 3500, 1650, 1240, 1140, 1050, 1008 $cm^{-1}$
(4) $^{13}$C-NMR (400 Mz) 102.9, 84.5, 81.6, 80.3, 74.0, 71.2 ppm
(5) Mean Molecular Weight: about 30,000

COMPARATIVE EXAMPLE 3

1.1 g of a white powder was obtained in the same manner as in Comparative Example 1, except that the amount of the sulfur trioxide/trimethylamine complex was changed to 2.8 g. The product was analyzed to give the following data.

(1) Sulfur Content: 9.1%
(2) Liquid Chromatography
Column: TSK2000PW (two columns connected)
Eluent: 0.2M $KH_2PO_4$
Flow Rate: 1.0 ml/min
Detector: differential refractometric detector
Retention Time: about 15.8 min.
(3) Infrared Absorption Spectrum (KBr) 3500, 1650, 1240, 1140, 1050, 1008 $cm^{-1}$
(4) $^{13}$C-NMR (400 Mz) 102.9, 84.5, 81.6, 80.3, 74.0, 71.2 ppm
(5) Mean Molecular Weight: about 10,000

COMPARATIVE EXAMPLE 4

0.5 g of β-cyclodextrin was dissolved in 10 ml of dry dimethylformamide (DMF), and a solution of 4.3 g of sulfur trioxide/trimethylamine complex as dissolved in 10 ml of DMF was added thereto. The reaction mixture was heated up to 70° C. with stirring. After reacted for 18 hours, only a viscous precipitate was separated by decantation of DMF. The thus separated residue was dissolved in 10 ml of 6% sodium acetate, and 30 ml of ethanol was added thereto to form a white precipitate. The precipitate was again dissolved in 10 ml of pure water. The solution was adjusted to have pH of 6 with barium hydroxide and then to have pH of 7 with barium carbonate. This was centrifuged to separate the supernatant. The supernatant was passed through a strongly acidic cation-exchange resin (Dowex 50 W, H+ Type, produced by Dow Chemical Co.) with eluting it with pure water to collect the eluate. The eluate was neutralized with 1M sodium hydroxide and freeze-dried to obtain sodium salt of β-cyclodextrin sulfonate as a white powder. This had a sulfur content of 14.5%.

Comparative Example 5

2 g of β-cyclodextrin was dissolved in 1.5 ml of pure water, 2.5 ml of 40% sodium hydroxide and 20 mg of sodium borohydride were added thereto, and 1 ml of epichlorohydrin was added thereto over a period of about 10 minutes with stirring at 50° C. After 2 hours, 2 ml of pure water was added to the reaction system, which was neutralized with 6M hydrochloric acid and then subjected to precipitation with ethanol of an amount of five times as large as the amount of the reaction mixture. The resulting precipitates were washed with ethanol and ether and dried to obtain 1.8 g of a white powder of β-cyclodextrin polymer.

TEST EXAMPLE 1

Action of Inhibiting Propagation of Cultivated Smooth Muscle Cells

A medial smooth muscle lamina was taken out from the thoracic aorta of a 6-week male Wister rat (from Nippon Charles River Co.), and this was cut into one-mm$^2$ pieces. The pieces were stuck to a 25-cm$^2$ cultivation flask (manufactured by Coning Co.) and incubated in a Dulbecco Modified Eagle Medium (hereinafter referred to as DMEM) containing 10% serum as put in the flask, for 2 to 3 weeks at 37° C. under the condition of 95% $O_2$+5% $CO_2$, in an incubator. The cells as extended and divided from the pieces were collected as primary-cultivated smooth muscle cells. The primary-cultivated smooth muscle cells were incubated in a laboratory dish with a diameter of 9 cm (manufactured by Coning Co.) having therein DMEM containing 10% serum (produced by Gibuco Co.), and they were subjected to subcultivation to an amount of three times as large as that of the cells in 3 to 4 days at their confluence. The operation was repeated 4 to 8 times, while the the 5th to 9th subcultivated cells were collected and used in the following test. The thus cultivated smooth muscle cells were dispersed in a 24-well plate (manufactured by Coning Co.) in a proportion of 2× $10^4$ smooth muscle cells/well/0.75 ml 10% serum-containing DMEM. After being left as they were overnight, the medium was exchanged for a serum-free DMEM and the cells were incubated for further 3 days in the incubator. Under the condition, the cultivated smooth muscle cells were in their $G_0$ stage (resting phase) as the cell cycle and did not divide further.

The sulfate compound of β-cyclodextrin polymer as produced in each of the examples and also the compounds produced in the comparative examples were dissolved in 10% serum+DMEM to form a test solution. This was added to the cells under the above-mentioned condition and the cells were incubated for 3 days, whereupon the number of the cells was counted with a coulter counter (manufactured by Nikkaki Co.). As is shown in Table 1 below, the sulfonate compounds of β-cyclodextrin polymer of the present invention significantly inhibited the propagating effect of the cultivated smooth muscle cells. In the table, the 50% inhibiting concentration indicates the concentration of the solution of the sulfonate compound of β-cyclodextrin polymer needed for inhibiting the propagating ability of the cultivated smooth muscle cells to 50% by addition of the ester compound to the cells, when the propagating ability of the smooth muscle cells is 100% in the absence of the ester compound.

TABLE 1

| Test Compound | | 50% Inhibiting Concentration (μg/ml) |
|---|---|---|
| Example 1 | Sodium salt of β-cyclodextrin polymer sulfate (sulfur content: 13.8%) | <0.1 |
| Example 2 | Sodium salt of β-cyclodextrin polymer sulfate (sulfur content: 14.2%) | <0.1 |
| Example 3 | Sodium salt of β-cyclodextrin polymer sulfate (sulfur content: 10.3%) | <0.1 |
| Comparative Example 1 | Sodium salt of β-cyclodextrin polymer sulfate (sulfur content: 6.5%) | 280 |
| Comparative Example 2 | Sodium salt of β-cyclodextrin polymer sulfate (sulfur content: 6.8%) | 250 |
| Comparative Example 3 | Sodium salt of β-cyclodextrin polymer sulfate (sulfur content: 9.1%) | 56 |
| Comparative Example 4 | Sodium salt of β-cyclodextrin sulfate (sulfur content: 14.5%) | 47 |
| Comparative Example 5 | β-cyclodextrin polymer | 3,200< |
| Comparative Example 6 | β-cyclodextrin(*) | 3,200< |

(*)Commercial product by Hayashibara Seibutsu Kagaku Kenkyusho KK.

TEST EXAMPLE 2

The following experiment was carried out in order to identify the effectiveness of β-cyclodextrin polymer sulfonates, depending upon difference in their molecular weights.

100 mg of the sodium salt of β-cyclodextrin polymer sulfonate as obtained in Example 1 was dissolved in 2 ml of 0.2M ammonium hydrogencarbonate solution. The resulting solution was charged in a Sephadex G-100 column (2.6×84 cm) as previously equilibrated with the same solvent. The column was eluted at a flow rate of 20 ml/h, whereupon the eluates were successively collected each in an amount of 2.0 ml and were determined by an anthronesulfuric acid method. The area of the elution curve was divided into five equal parts, which were separately collected. They were freeze-dried to be fractions Nos. 1 to 5 in the order of the elution. The fractions were tested with respect to the action of inhibiting propagation of cultivated smooth muscle cells in accordance with the same test method as mentioned in Test Example 1. The results obtained are shown in Table 2 below.

TABLE 2

| Test Compound | Mean Molecular Weight | 50% Inhibiting Concentration (μg/ml) |
|---|---|---|
| Fraction No. 1 | 3,500 | 0.2 |
| Fraction No. 2 | 5,000 | <0.1 |
| Fraction No. 3 | 7,500 | <0.1 |
| Fraction No. 4 | 11,000 | <0.1 |
| Fraction No. 5 | 18,000 | <0.1 |

What is claimed is:

1. A method of inhibiting propagation of smooth muscle cells with a β-cyclodextrin polymer sulfonate comprising a sulfur content of 10% by weight or more.

2. The method of claim 1 wherein the β-cyclodextrin polymer sulfonate comprises a sulfur content of at least 12% by weight.

3. The method of claim 1 wherein the β-cyclodextrin polymer sulfonate possesses a sulfur content which ranges from at least 10% to about 20% by weight.

4. The method of claim 1 wherein said β-cyclodextrin polymer sulfonate is produced using a sulfonating agent selected from the group consisting of sulfur trioxide complexes, sulfuric acid anhydride, concentrated sulfuric acid, and chlorosulfuric acid.

5. The method of claim 1 wherein said β-cyclodextrin polymer sulfonate contains from about 2 to 40 β-cyclodextrin monomers.

6. The method of claim 1, wherein said β-cyclodextrin polymer sulfonate contains from about 2 to 10 β-cyclodextrin monomers.

* * * * *

UNITED STATES PATENT AND TRADEMARK OFFICE
CERTIFICATE OF CORRECTION

PATENT NO. : 5,512,665

DATED : April 30, 1996

INVENTOR(S) : Hideki UCHIYAMA et al

It is certified that error appears in the above-indentified patent and that said Letters Patent is hereby corrected as shown below:

In Column 6, line 2, after "about" and before "minutes", insert -- 10 --.

Signed and Sealed this

Sixteenth Day of July, 1996

Attest:

BRUCE LEHMAN

Attesting Officer

Commissioner of Patents and Trademarks